United States Patent [19]

Frevel et al.

[11] 3,912,789

[45] Oct. 14, 1975

[54] DEALKYNATION OF OLEFIN AND DIOLEFIN STREAMS

[75] Inventors: Ludo K. Frevel, Midland; Leonard J. Kressley, Saginaw, both of Mich.

[73] Assignee: The Dow Chemical Company, Midland, Mich.

[22] Filed: Dec. 17, 1973

[21] Appl. No.: 425,408

[52] U.S. Cl............................. 260/681.5; 260/677 H
[51] Int. Cl.²........................................... C07C 7/01
[58] Field of Search...... 260/677 H, 681.5, 681.5 C; 252/416

[56] References Cited
UNITED STATES PATENTS

| | | | |
|---|---|---|---|
| 2,426,604 | 9/1947 | Frevel et al. | 260/681.5 |
| 3,076,858 | 2/1963 | Frevel et al. | 260/677 R |
| 3,327,013 | 6/1967 | Frevel et al. | 260/681.5 |
| 3,682,585 | 8/1972 | Frevel et al. | 423/219 |

FOREIGN PATENTS OR APPLICATIONS

| | | | |
|---|---|---|---|
| 1,418,142 | 2/1970 | Germany | 260/677 H |
| 738,484 | 7/1966 | Canada | 260/677 H |

*Primary Examiner*—Veronica O'Keefe
*Attorney, Agent, or Firm*—Glwynn R. Baker

[57] ABSTRACT

Lower alkynes such as acetylene, methylacetylene, vinylacetylene, and ethylacetylene are effectively removed from olefin and diolefin streams by contacting the contaminated liquid containing dissolved hydrogen with a finely divided metal catalyst consisting of copper plus at least one polyvalent activator metal supported on a high surface area gamma-alumina containing a defined amount of $Na_2O$. The catalyst is easily regenerated by oxidation and hydrogen reduction at moderately elevated temperatures.

7 Claims, No Drawings

3,912,789

DEALKYNATION OF OLEFIN AND DIOLEFIN STREAMS

BACKGROUND OF THE INVENTION

This invention relates to an improved method of removing acetylenes from olefin and diolefin streams contaminated with small concentrations of the same.

Product streams of liquid or liquefiable olefins and diolefins such as butenes, pentenes, butadiene, and isoprene in particular are characteristically contaminated with small amounts of acetylenic impurities which are undesirable and often have to be removed at least to the level of a few parts per million in order for the stream to meet process requirements, for example, in polymerization processes or to avoid formation of explosive metal acetylides in equipment. Streams of olefins and diolefins such as propylene, pentenes, isoprene, butylenes, and butadiene are common examples where minor amounts of corresponding alkynes are often found.

It is known that acetylenic impurities can be selectively hydrogenated and thereby removed from a gas stream passing a mixture of the gas with hydrogen over a copper catalyst of moderate activity. Such a method is described in our U.S. Pat. Nos. 3,076,858 and 3,327,013. More recently, a highly activated copper catalyst has been found effective for removing paramagnetic gases such as $O_2$, NO, $ClO_2$, and $O_3$ from various gas streams, see U.S. Pat. No. 3,682,585. This same catalyst has also been found to be highly effective for removing acetylenic contaminants from a hydrocarbon or other gas stream by polymerizing or decomposing these contaminants upon contacting the gas stream at elevated temperatures. This process is described in our copending application entitled Removal of α-Acetylenes From Gas Streams, Ser. No. 415,457, filed Nov. 12, 1973. However, this catalyst is too active a hydrogenation catalyst for selective hydrogenation of acetylenic impurities in an olefin or diolefin gas stream; both acetylenic and olefinic bonds are reduced under these conditions.

SUMMARY OF THE INVENTION

It has now been found that the superactive promoted copper catalyst described in U.S. Pat. No. 3,682,585 can be used to hydrogenate selectively α-alkyne contaminants of $C_3$, $C_4$, and $C_5$ olefin and diolefin streams by contacting the catalyst with the liquefied hydrocarbon stream containing dissolved hydrogen gas. The process is operable within a relatively broad temperature range of about 10°–150°C. at a pressure at least sufficient to maintain the hydrocarbon stream in the liquid state and to prevent any significant proportion of the dissolved hydrogen from forming gas bubbles in the liquid stream while it is in contact with the catalyst.

DETAILED DESCRIPTION

The catalyst consists essentially of a mixture of finely divided copper metal and a minor proportion of at least one polyvalent activator metal supported on gamma-alumina having a surface area of at least 10 square meters per gram and containing about 0.1 to 1.5 percent by weight of $Na_2O$. Preferably, the copper metal comprises about 3 to 13 percent by weight of the alumina. The catalyst has a long life and, when its activity begins to fall off, is easily regenerated by contacting it with an oxygen-containing gas and subsequently reducing the oxidized catalyst with hydrogen. Thus, the catalyst can be run for extended processing periods with many cycles of processing, oxidation, and reduction steps with little or no overall loss of catalytic activity.

The metals useful as activators in the catalyst of this invention are metals which are normally or can be polyvalent and whose oxides are reducible by hydrogen or a hydrogen-inert gas mixture at a temperature below about 350°–400°C. Preferably, the weight of activator metal or metals is less than the weight of copper in the catalyst and most preferably is about 1–20 percent of the combined weight of copper and activator. Suitable activator metals include silver, platinum, palladium, manganese, nickel, cobalt, chromium, and molybdenum.

The support employed is a gamma-alumina having a high surface area (BET surface area) of at least 10 square meters per gram and particle sizes in the range of those substantially passing a No. 8 sieve (U.S. Sieve Series) to those passing a No. 18 sieve, but generally retained on a No. 30 sieve. It is also essential that the gamma-alumina contain about 0.1 to 1.5 percent by weight of sodium, present in combined form with the alumina and reported as $Na_2O$. A finer grade of gamma-alumina may be employed if the gamma-alumina is first granulated to provide particle sizes in the specified range.

In carrying out the preparation of the present catalyst, a relatively concentrated aqueous solution containing copper is prepared by dissolving about 2.5 to 3 parts by weight of any of the copper salts readily soluble in water, for example, $CuSO_4 5H_2O$ or $Cu(NO_3)_2.3H_2O$ in 1 part by weight of water. More preferably, the water is acidified with about 5 to 10 percent by weight of a mineral acid such as $HNO_3$ or $H_2SO_4$. The water-soluble salts of any activator metals to be employed are dissolved in the copper salt solution in the requisite amount. This concentrated aqueous solution is poured onto a quantity of gamma-alumina in the requisite amount to provide from about 3 to about 13 percent by weight of reduced metal based on the total weight of the prepared agent. The mixture is stirred briefly and then dried, as in a 110°C. oven, and then roasted at a temperature of about 250°–400°C., and more preferably 290°–400°C. During roasting, the copper salts and activator metal salts are converted to oxides or anhydrous metal salts in such a manner that a single phase is formed with the alumina, as determined on examination by X-ray diffraction. This step is not completely understood but is essential to the proper preparation of the present highly efficient, high capacity catalyst.

Preparation of the catalyst in reduced metal form is completed upon passing a stream of hydrogen, more preferably a mixture of hydrogen and nitrogen, over a bed of the roasted material for about 30 minutes or more while the bed is maintained at a temperature of about 200°–400°C., thus reducing the roasted material to metal form. About two times the stoichiometric amount of hydrogen suffices to make the reduction as complete as desired. The resulting product consists of extremely finely divided "black" copper, with admixed activator metal, intimately and widely dispersed throughout a high surface area gamma-alumina.

While earlier known catalysts when freshly prepared exhibit a higher efficiency after having been reoxidized once and again reduced, the present catalyst does not need such activation treatment, though activation treatment does not adversely affect its performance.

However, the reduction or regeneration temperature critically affects its dynamic efficiency. If regeneration temperatures are unduly high, support degeneration tends to occur with resulting lowering in reagent efficiency and capacity. Generally a regeneration temperature of about 250°–300°C. is preferred, and especially a temperature of about 270°C.

The prepared and reduced catalyst is used according to the present invention simply by placing it in an enclosed zone or tube in which there is obtained intimate contact between the catalyst and the liquid flowing through the reaction zone. Only moderate process temperatures are required since the catalyst is effective at temperatures as low as about 10°C. Temperatures as high as 150°C. may be employed although a somewhat lower temperature is normally used and a process temperature range of about 50–100°C. is preferred. Higher temperatures favor the formation of undesirable byproducts at an increasing rate and it becomes more difficult to prevent bubbles of hydrogen gas from forming in the reaction zone with consequent hot spots and unselective hydrogenation.

The process pressure appears to have little or no significant effect as long as it is sufficient to maintain the process stream as a substantially homogeneous liquid phase. Normally, superatmospheric pressure is employed, usually up to about 10–20 atmospheres depending upon the particular hydrocarbon stream and the process temperature, although higher pressures can be used if desired.

Alpha-alkynes which are effectively removed from olefin and conjugated diolefin streams such as propylene, butylene, 1,3-butadiene, isoprene and the like include acetylene, methylacetylene, vinylacetylene, and 3-methyl-1-butyne. Purified olefin and diolefin streams containing less than 5 parts per million of acetylenic impurities are obtainable on a continuing basis by the process of the present invention.

Olefinic hydrocarbon streams containing up to several percent by volume of alkyne impurities can be effectively purified by this process. Optimum results are obtained when no more than about 0.2 percent of these impurities is present. Under these conditions, the liquid hydrocarbon stream can be passed through the catalyst bed at a rate of about 1–5, preferably 2.5-4 liquid volumes per volume of bed per hour with substantially complete removal of alkynes and the process part of the operating cycle can be as long as 175–200 hours before the effectiveness of the catalyst is significantly diminished and regeneration is necessary. Higher concentrations can be handled by limiting the concentration of dissolved hydrogen in the feed to a first reactor, then adding more hydrogen to that effluent and passing it through a second reactor for completion of the acetylene removal. The recycle of product is an alternative method for handling higher acetylene concentrations.

The proportion of dissolved hydrogen in the feed to the catalyst bed is not a critical factor in the present process. For obvious reasons, at least one mole of hydrogen per mole of acetylenic bond is desirable and a moderate excess of hydrogen is preferred, for example, up to about 2 moles per mole of acetylenic bond.

In a preferred mode of operation, a stream of 1,3-butadiene or other olefin or diolefin containing 500–1000 ppm total of alkynes is contacted with hydrogen pressurized at about 150 p.s.i.g. at ambient temperature and the hydrocarbon stream containing dissolved hydrogen is then passed through a heat exchanger to raise its temperature to about 50°C. The heated stream is then passed at that temperature through a bed of granular catalyst as defined herein at a liquid space velocity of about 3.5 v./v./hr. The effluent stream contains less than 10 ppm of alkyne contaminants. Operation is continued under these conditions for about 150–200 hours when slowly increasing contaminant concentration in the effluent indicates that regneration is desirable.

When the catalyst begins to lose its effectiveness, the flow of the stream through the catalyst bed is stopped, or, preferably, switched by valving to an alternate bed, while the exhausted bed is regenerated. A partial regeneration may be accomplished under some conditions by flushing with an inert gas, preferably nitrogen, at a temperature from ambient to about 250°C. followed by reduction with hydrogen, preferably a mixture of a minor proportion of hydrogen in nitrogen or argon at about 200°–400°C., preferably at 250°–300°C. However, for full regeneration of an exhausted catalyst it is necessary to flush the catalyst bed with a desorbing gas such as argon or nitrogen, then to reoxidize the catalytic metals by passing an oxygen-containing gas through the bed at about 200°–400°C., and finally to reduce the oxidized catalyst with hydrogen as described above. The oxygen-containing gas is preferably a mixture of nitrogen, argon, or $CO_2$ with about 0.5–10 percent oxygen.

The catalyst is subject to poisoning by sulfur compounds such as $H_2S$, mercaptans, organic sulfides, $SO_2$, and $SO_3$. If the hydrocarbon stream to be purified contains sulfur compounds as additional impurities, these should be removed as far as possible by scrubbing with an appropriate sweetening liquid or by other known sulfur removal means before the alkyne removal step.

To illustrate the catalyst of the invention and the method of using the same, catalysts were prepared as follows:

A. A portion of gamma-alumina containing 0.1 to 1.5 percent by weight $Na_2O$ and having particle sizes substantially all passing a No. 8 to a No. 18 sieve (U.S. Sieve Series) was impregnated with an aqueous solution of cupric sulfate and nickel sulfate containing 99 parts of copper per part of nickel. The impregnated gamma-alumina was dried and roasted, thus converting the metal salts to a light green mixed oxide of copper and aluminum present as a single phase. The roasted material was then treated with a mixture of nitrogen and hydrogen at a temperature of 250°C. for a sufficient period (about 3 hours) for the oxides to be reduced to the metal. The total metal content of the resulting supported catalyst was about 5 percent by weight. The BET surface area of the catalyst was found by test to be 215 square meters per gram.

B. 38.5 Grams of activated alumina containing 0.1 to 1.5 percent by weight $Na_2O$ and having particle sizes substantially all passing a No. 8 to a No. 18 sieve was impregnated with 14 milliliters of an aqueous solution containing 8.7 grams of $Cu(NO_2)_2 \cdot 3H_2O$ and 0.89 gram of AgNO$_3$. The impregnated alumina was dried for 1 hour at 100°C., then roasted at 350°C. for 3 hours to form a light green mixed oxide of copper and aluminum present as a single phase, and finally, the oxide was reduced at 290°C. with a nitrogen-hydrogen mixture to yield alumina impregnated with black, finely-divided metal. The metal consisted of 90 percent of copper and 10 percent of silver. The metal content of the catalyst prepared was about 6.5 weight percent.

C. A portion of activated gamma-alumina containing 0.1 to 1.5 percent by weight Na$_2$O and having particle sizes substantially all passing a No. 8 to a No. 18 sieve was impregnated with an aqueous solution of cupric nitrate and silver nitrate containing 4 parts of copper per part of silver. The impregnated alumina was dried for one hour at 110°C., then roasted at 350°C. for 3 hours to form a light green mixed oxide of copper and aluminum present as a single phase, and finally, this oxide was reduced at 290°C. with a nitrogen-hydrogen mixture to yield alumina impregnated with black, finely-divided metal. The metal consisted of 80 percent by weight of copper and 20 percent by weight of silver. The metal content of the catalyst was 6.8 weight percent.

D. 41.5 grams of an activated gamma-alumina having a BET surface area greater than 10 square meters per gram containing 0.1 to 1.5 percent by weight Na$_2$O and having particle sizes substantially all passing a No. 8 to a No. 18 sieve was impregnated with 12 milliliters of an aqueous solution containing 6.8 grams of Cu(NO$_3$)$_2$.3H$_2$O and 5.45 grams of Ni(NO$_3$)$_2$.6H$_2$O. The impregnated alumina was dried for 2 hours at 110°C. and then roasted at 350°C. for 3 hours to form a light green mixed oxide of copper and aluminum present as a single phase. Reduction of the copper and nickel oxides to the respective metals was effected with hydrogen at 400°C. The reduced metal consisted of 3 parts by 2 parts by weight of nickel. The metal content of the catalyst was about 6.6 weight percent.

E. 10 Grams of Ni(NO$_3$)$_2$.6H$_2$O, 4 grams of Cr(NO$_3$)$_3$.9H$_2$O, 8 grams of 50 percent by weight Mn(NO$_3$)$_2$ aqueous solution and 0.1 gram of AgNO$_3$ were dissolved in an aqueous solution consisting of 100 milliliters of water plus 10 milliliters of concentrated nitric acid (16 normal). After solution of the above salts was complete, 280 grams of Cu(NO$_3$)$_2$.3H$_2$O were dissolved in solution yielding a total of 240 milliliters of impregnating solution. Thiss impregnating solution was dispersed on 747 grams of gamma-alumina. The gamma-alumina contained 1.18 percent by weight of Na$_2$O. In addition, the gamma-alumina had a BET surface area of about 177 square meters per gram and a particle size such that the gamma-alumina passed a No. 8 sieve and was retained on a No. 18 sieve. The impregnated alumina was dried at about 160°C. for about 2 hours. The dried material was then roasted at 400°C. for about 5 hours. At this time, the impregnated alumina was an olive green color. On X-ray diffraction examination, no separate phase for copper oxide was detected. Instead, all the metal oxides had been transformed into a single phase.

EXAMPLE 1

A reactor was made up using a 12 inch length of ⅜ inch schedule 40 stainless steel pipe and was loaded with 26 ml (27.45 g.) of 8–14 mesh catalyst centered in about two thirds of its length with the ends filled with 3 mm glass beads separated from the catalyst by layers of glass wool. The catalyst was prepared as described in (E) above. This unit was placed in a 12 inch long tubular heater, heated to 280°C., and a stream 0f 5% H$_2$ in N$_2$ passed through it to reduce the catalyst. When completely reduced (determined by the absence of water in the effluent) it was cooled to room temperature and then connected at the top to a small guard bed of activated alumina in a ⅜ inch by 7 inch stainless steel schedule 40 pipe, and at the bottom via small stainless steel tubing lines to aa flowmeter, flow control valve and receiver. The alumina served to remove p-t-butyl pyrocatechol present in the crude isoprene.

An evacuated 8 liter pressure vessel was loaded with about 4.7 liters of isoprene-C$_5$-mixture containing 230 ppm 1-penten-4-yne, then pressurized to 100 psig with H$_2$ and allowed to stand overnight. A connection was made from a valve at the bottom of this vessel to the inlet of the alumina guard bed. Pressure in the system was maintained at 100 psig by a line from a regulator on a hydrogen cylinder connected to a valve at the top of the feed vessel. Liquid flow then passed through the reactor from top to bottom, through a flowmeter under pressure, and was controlled by a small needle valve following the flowmeter. A small loose coil of stainless steel tubing led from the needle valve to a 1.7 liter vessel which was suspended by a thin wire from a triple beam balance so that the product could be continuously weighed within 1 gram. A tee and valve in the line from the flowmeter also allowed samples to be removed from the flowing stream for analysis.

Initially the reactor temperature was set at about 90°C. and about 2400 ml of hydrocarbon run through at liquid hourly space velocities of 2–2.5 v./v./hr. Analysis by gas chromatography did not detect any alkynes. The reactor temperature was lowered to around 48° to 50°C. and another liter run through with no detectable alkynes in the product. The remaining 1.3 liters was run at about 25°C. and the effluent was still free of alkynes.

| Experimental Data | |
|---|---|
| Duration of run | 50.4 hrs. |
| Weight of product | 3221 g. |
| Composition of isoprene feed | Vol. % |
| Isoprene | 82.83 |
| Pentanes | 10.15 |
| 2-pentene | 3.98 |
| 2-methyl-1-butene | 2.63 |
| 1-pentene | 0.36 |
| 2-methyl-2-butene | 0.0065 |
| 2-methyl-1-butane | 0.0075 |
| 1,3 pentadiene | 0.0015 |
| 2-methyl-1-buten-3-yne | 0.0015 |
| 1-penten-4-yne | 0.0230 |

The isoprene content of the product was within ±0.3% the same as that of the feed; the α-acetylenes were nil (<5 ppm).

EXAMPLE 2

Next a butadiene-C$_4$-mixture, containing 618 ppm alpha-acetylenes, was loaded into the feed tank and hydrogen pressure of 200 psig applied. The liquid C$_4$'s were then continued over the same catalyst without any reactivation. Flow rates of up to 4.5 LHSV were used. At 25°C. reactor temperature, very small amounts (up to 5 or 10 ppm) of $C_4$-acetylenes were found in titration samples. After about 2.5 liters had been run, the temperature was raised and held between 45° and 50°C. $H_2$-pressure on the system was then incrementally lowered until at about 130 psig evidence of acetylenes coming through was observed. The pressure was then returned to ~ 150 psig and held there. After nearly 16 liters of liquid $C_4$'s and the ~ 4.7 liters of liquid $C_5$'s, the catalyst began to weaken. A final analysis of product from the line resulted in 75 ppm acetylenes. A check of the previous 930 ml showed about 15 ppm.

Experimental Data

| | | |
|---|---|---|
| Duration of run | | 146.6 hrs |
| Weight of product | | 8812 g. |
| | Composition, Vol. % | |
| | Crude $C_4$ | Product |
| Methane | 0.003 | 0.006 |
| $C_3$'s | 0.10 | 0.17 |
| i-butane | 0.5 | 0.6 |
| n-butane | 3.0 | 3.0 |
| butene-1 | 13.2 | 13.7 |
| i-butene | 10.1 | 10.2 |
| t-butene-2 | 21.2 | 20.9 |
| c-butene-2 | 19.6 | 19.0 |
| 1,3 butadiene | 31.8 | 32.2 |
| 1,2 butadiene | 0.15 | 0.13 |
| methyl acetylene | 0.0020 | nil (<5 ppm) |
| ethyl acetylene | 0.0304 | nil |
| vinyl acetylene | 0.0294 | nil |
| heavies | 0.64 ± 0.20 | 0.46 ± 0.20 |

The product was faintly yellow.

After the dealkynation of Example 2, the catalyst bed was flushed with nitrogen and regenerated by oxidation and reduction. The reactor was depressurized after the procedure of Example 2, then nitrogen at about 150 ml./min. was passed through first at room temperature, then after 30 minutes the temperature was raised to 100°C. and nitrogen purge was continued for 90 minutes when the odor of hydrocarbons in the effluent was negligible. The catalyst was then heated to 300°C. and nitrogen containing about one percent oxygen was passed through it at 200 ml./min. for 10 hours. The reoxidized catalyst was flushed again with nitrogen and then was reduced by passing through a stream of nitrogen containing 5% hydrogen at 150 ml./min. for 2 hours.

EXAMPLE 3

A stream of crude butadiene containing a relatively high concentration of α-acetylenes was then contacted with hydrogen at 202-250 p.s.i.g. and the liquid stream was passed through the regenerated catalyst at 42°-58°C. and at about the same liquid space velocity used in Example 2. The experimental data are listed below.

Experimental Data

| | | |
|---|---|---|
| Pressure of $H_2$ (25°C.) | | 202–250 psig |
| Temperature | | 42–58°C. |
| Duration of run | | 59.83 hours |
| Weight of product | | 3657 g. |
| | Composition, Vol. % | |
| | Crude $C_4$ | Product |
| Methane | 0.03 | 0.11 |
| $C_2$'s | nil | 0.006 |
| $C_3$'s | 0.01 | 0.04 |
| i-butane | 1.54 | 1.70 |
| n-butane | 4.98 | 4.93 |
| butene-1 | 10.24 | 11.86 |
| i-butene | 27.64 | 26.63 |
| t-butene-2 | 6.28 | 6.21 |
| c-butene-2 | 3.13 | 3.11 |
| 1,3 butadiene | 45.43 | 45.31 |
| 1,2 butadiene | 0.007 | 0.13 |
| methyl acetylene | 0.19 | 0.011 |
| ethyl acetylene | 0.08 | 0.015 |
| vinyl acetylene | 0.42 | nil |

We claim:

1. A process for removing alpha-acetylenes from a liquid hydrocarbon stream which comprises contacting said stream in the liquid state and containing dissolved hydrogen gas at about 10°–150°C. with a bed of supported catalyst consisting essentially of a mixture of finely divided copper metal and a minor proportion of at least one polyvalent activator metal of the group consisting of silver, platinum, palladium, manganese, cobalt, nickel, chromium, and molybdenum supported on gamma alumina having a surface area of at least about 10 sq. meters per gram and containing about 0.1–1.5 percent by weight of $Na_2O$.

2. The process of claim 1 wherein the liquid hydrocarbon is passed through the catalyst bed at a liquid space velocity of about 1–5 vols./vol./hour.

3. The process of claim 1 wherein the catalyst bed is contacted with the liquid hydrocarbon at superatmospheric pressure.

4. The process of claim 1 wherein the hydrocarbon is crude butadiene.

5. The process of claim 1 wherein the hydrocarbon is crude isoprene.

6. The process of claim 1 wherein the copper metal comprises about 3–13 percent by weight of the alumina.

7. The method of claim 1 wherein after contacting the acetylene-containing liquid with the catalyst for a substantial period of time, the flow of said liquid over the catalyst is stopped, a stream of oxygen-containing gas is passed over the catalyst at about 200°–400°C. until the copper and activator metal are substantially oxidized, the oxidized catalyst is contacted with hydrogen at about 200°–400°C. until reduction of the oxidized metals is essentially complete, the flow of hydrogen is stopped, and the flow of acetylene-containing liquid over the catalyst is resumed, and the above cycle of oxidation, reduction, and reuse is repeated.

* * * * *

UNITED STATES PATENT AND TRADEMARK OFFICE
CERTIFICATE OF CORRECTION

PATENT NO. : 3,912,789
DATED : October 14, 1975
INVENTOR(S) : L. K. Frevel and L. J. Kressley It is certified that error appears in the above-identified patent and that said Letters Patent are hereby corrected as shown below:

Col. 2, line 32, first formula, delete "$CuSO_4 5H_2O$" and insert --$CuSO_4 \cdot 5H_2O$--

Col. 4, line 15, delete "regneration" and insert --regeneration--

Col. 5, line 38, after "parts", delete "by" and insert --of copper per--

Col. 5, line 41 insert after the "," --4 grams of $Co(NO_3)_2 \cdot 6H_2O$--

Col. 5, line 43, delete "0.1" and insert --1.0--

Col. 5, line 45, first occurrence, delete "milliluters" and insert --milliliters--

Col. 5, line 49, delete "Thiss" and insert --This--

Col. 6, line 13, delete "aa" and insert --a--

In all of the following formulas the "dot" in the formula should be raised, as in the example that follows:
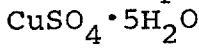
$$CuSO_4 \cdot 5H_2O$$

Col. 2, line 32, second formula
Col. 4, line 66
Col. 5, line 31
Col. 5, line 32
Col. 5, line 41
Col. 5, line 42
Col. 5, line 47

Signed and Sealed this
*third* Day of *February 1976*

[SEAL]

*Attest:*

RUTH C. MASON
*Attesting Officer*

C. MARSHALL DANN
*Commissioner of Patents and Trademarks*